United States Patent
Guillou et al.

(10) Patent No.: US 11,754,020 B2
(45) Date of Patent: Sep. 12, 2023

(54) HEAT EXCHANGER FOR A TURBOMACHINE AND MANUFACTURING THEREOF

(71) Applicant: Safran Aircraft Engines, Paris (FR)

(72) Inventors: Lancelot Guillou, Moissy-Cramayel (FR); Stéphane Louis Lucien Auberger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 65 days.

(21) Appl. No.: 17/264,636

(22) PCT Filed: Jul. 30, 2019

(86) PCT No.: PCT/FR2019/051871
§ 371 (c)(1),
(2) Date: Jan. 29, 2021

(87) PCT Pub. No.: WO2020/025895
PCT Pub. Date: Feb. 6, 2020

(65) Prior Publication Data
US 2021/0310443 A1    Oct. 7, 2021

(30) Foreign Application Priority Data

Jul. 31, 2018   (FR) ...................................... 1857152

(51) Int. Cl.
*F02K 3/115* (2006.01)
*F01D 25/12* (2006.01)
(Continued)

(52) U.S. Cl.
CPC .............. *F02K 3/115* (2013.01); *F01D 25/12* (2013.01); *F02C 7/14* (2013.01); *F28F 1/022* (2013.01);
(Continued)

(58) Field of Classification Search
CPC .......... F02K 3/115; F01D 25/02; F01D 25/12; F02C 7/14; F28F 1/022; F28F 1/26;
(Continued)

(56) References Cited

U.S. PATENT DOCUMENTS 5,507,529 A * 4/1996 Martins ................... F16L 37/56
285/124.2
5,567,493 A * 10/1996 Imai ........................ B29C 48/11
425/464

(Continued)

FOREIGN PATENT DOCUMENTS

FR          3060057 A1    6/2018

OTHER PUBLICATIONS

International Search Report and Written Opinion dated Nov. 7, 2019, issued in corresponding International Application No. PCT/FR2019/051871, filed Jul. 30, 2019, 7 pages.

*Primary Examiner* — Loren C Edwards
(74) *Attorney, Agent, or Firm* — Christensen O'Connor Johnson Kindness PLLC

(57) ABSTRACT

An annular heat exchanger for a turbomachine, is intended, for example, to be supported by an annular ferrule of a housing of the turbomachine, and includes an annular one-piece part having a first fluid circuit having at least one first conduit and at least one second conduit extending in an annular manner. The first conduit and the second conduit lead into a first cavity formed on a first circumferential end of said annular part, and the heat exchanger includes detachable sealing means which are applied to said first end and designed to allow a flow of fluid from the second conduit into the first cavity then into the first conduit.

10 Claims, 4 Drawing Sheets

(51) Int. Cl.
*F02C 7/14* (2006.01)
*F28F 1/02* (2006.01)
*F28F 1/26* (2006.01)

(52) U.S. Cl.
CPC ............ *F28F 1/26* (2013.01); *F05D 2240/81* (2013.01); *F05D 2260/213* (2013.01); *F05D 2260/22141* (2013.01); *F28F 2220/00* (2013.01)

(58) Field of Classification Search
CPC ...... F28F 2220/00; F28F 9/0246; F28F 9/026; F28F 9/0268; F28F 9/028; F28F 9/0282; F05D 2240/81; F05D 2260/213; F05D 2260/22141
See application file for complete search history.

(56) References Cited

U.S. PATENT DOCUMENTS

| | | | |
|---|---|---|---|
| 2014/0202158 A1* | 7/2014 | Storage | F02C 7/14 60/722 |
| 2015/0000865 A1 | 1/2015 | Ueda | |
| 2015/0135726 A1 | 5/2015 | Hundley, Jr. et al. | |
| 2016/0348548 A1 | 12/2016 | Borghese et al. | |

* cited by examiner

HEAT EXCHANGER FOR A TURBOMACHINE AND MANUFACTURING THEREOF

FIELD OF DISCLOSURE

Embodiments of the present disclosure relate to a heat exchanger and more particularly the cooling of the oil in an aircraft engine.

BACKGROUND

FIG. 1 represents a turbomachine 10 with double flow which comprises moving parts which rub against other moving parts or against fixed parts, this connection is for example a bearing. In order not to break due to heating due to friction, the parts are sprayed with oil which allows on the one hand to limit (or contain) their heating and, on the other hand, to lubricate them to facilitate the sliding of the parts on top of each other.

The oil circulates in a circuit provided with heat exchangers, in particular oil/air exchangers 12, as shown in FIG. 2, having a matrix, in the form of a sinuous pipe shaped so as to carry out an exchange of heat, in which the oil from the parts is introduced then cooled before being injected again on the parts. The heat exchanger 12 shown in FIG. 2 is an annular heat exchanger 12 which is mounted on the radially internal or external face (relative to the longitudinal axis 14 of the turbomachine) of an annular ferrule 16 delimiting radially outwards or inside an annular vein for the flow of a secondary air flow.

FIG. 3 shows schematically the principle of circulation of a fluid to be cooled, in particular oil, in the heat exchanger 12 as shown in FIG. 2. The heat exchanger 12 comprises an annular part 18 comprising a first circuit 20 formed of first conduits 22 and second conduits 24 for the circulation of oil to be cooled and a second circuit 26 formed of a first conduit 28 and a second conduit 30 for the circulation of oil defrosting the first 22 and second 24 conduits of the first circuit 20. The exchanger 12 is an annular exchanger which extends around the axis 14 of the turbomachine. In FIG. 3 are shown the longitudinal dimension of the exchanger 12 in the direction L and the circumferential dimension of the exchanger 12 in the direction C.

As can be seen, the first conduits 22 of the first circuit 20 include first portions 22a which extend between a fluid inlet 32 and a first fluid connection member 34a and second portions 22b which extend between a second fluid connection member 34b and an outlet 36 for fluid. The second conduits 24 of the first circuit 20 extend between the first fluid connection member 34a and the second fluid connection member 34b. In this way, the oil flows from the fluid inlet 32, in the first portions 22a of the first conduits 22, in the first fluid connection member 34a, in the second conduits 24 of the first circuit 20, in the second member 34b for fluid connection, in the second portions 22b of the first conduits 22 then towards the outlet 36 for oil.

The first conduit 28 of the second circuit 26 comprises a first portion 28a which extends between the fluid inlet 32 and the first member 34a for fluid connection and a second portion 28b which extends between the second member 34b of fluid connection and the outlet 36 of fluid.

The second conduit 30 of the second circuit 26 extends between the first fluid connection member 34a and the second fluid connection member 34b. In this way, the oil flows from the fluid inlet 32, into the first portion 28a of the first conduit 28, into the first fluid connection member 34a, into the second conduit 30, into the second connection member 34b fluid, in the second portion 28b of the first conduit 28 of the second circuit 26 then to the oil outlet 36. Thus shaped, the oil of the second circuit 26 can allow thawing of the first circuit 20 when necessary.

As can be seen, the connecting members 34a, 34b thus used to make the fluid connection between the first conduits 22, 28 and the second conduits 24, 30 of the first circuit 20 and of the second circuit 26. However, these parts are complicated to achieve since they must include oil recirculation channels. In addition, due to the structural independence of these connecting members 34a, 34b, it is necessary to fix them by welding or brazing to the annular part, which requires particular vigilance since it is imperative that no welding or brazing does not block, even partially, the flow of oil in the first circuit 20 or the second circuit 26. It is therefore necessary to set up quality control operations which are long and costly. Furthermore, the fixing of these connecting members 34a, 34b makes them non-removable, which is not practical when it is desired to be able to simply inspect the first circuit 20 and the second circuit 26. Finally, given the location of the heat exchanger 12 of the annular air flow path, it is essential that its radial dimension is limited so as not to have to modify the diameter of the shell, which would necessarily impact the other parts which are fixed to it.

The purpose of the proposed disclosure is in particular to provide a simple and effective solution to the aforementioned problems of the prior art.

SUMMARY OF THE DISCLOSURE

Is thus proposed an annular heat exchanger of longitudinal axis for a turbomachine, intended for example to be supported by an annular shell of a casing of the turbomachine, comprising a monobloc annular part comprising a first circuit fluid comprising at least a first conduit and at least a second conduit extending annularly, characterized in that the first conduit and the second conduit open into a first cavity formed at a first circumferential end of the annular part and in that it comprises removable sealing means which are attached at the level of the first end and configured so as to allow a flow of fluid from the second conduit, into the first cavity and then into the first conduit.

Thus, the fluid connection at one end of the heat exchanger can be carried out directly inside the annular part and no longer by means of fluid connection members. Indeed, it is here important to note that the cavity which ensures the fluidic communication between the first conduit and the second conduit of the first circuit is formed in the annular part which is monobloc unlike the prior art where the fluidic connection is carried out in the fluidic connection members fixed by welding or soldering.

According to another characteristic, the annular part can comprise a second fluidic circuit comprising at least a first conduit and at least a second conduit arranged on either side of the first conduit and second conduit of the first circuit in a direction perpendicular to the longitudinal direction, and in which the first conduit and the second conduit of the second circuit open into a second cavity formed at the first circumferential end of the annular part, the sealing means also being attached to the first end so allowing a flow of fluid from the second conduit of the second circuit, into the second cavity and then into the first conduit of the second circuit.

The second cavity can be formed radially outside the first cavity.

The first cavity can open circumferentially at the first circumferential end and the sealing means can comprise a first sealing member mounted at the opening of the first cavity.

Similarly, the second cavity can open radially at the first circumferential end and the sealing means can comprise a second sealing member mounted at the opening of the second cavity.

The disclosure is thus of particular interest when the annular part comprising the first circuit and the second circuit is made by extrusion, causing the cavities to be made after the extrusion proper and it is sufficient to carry out subsequent machining to make the cavities for connecting the first conduits with the second conduits of the first and second circuits. These cavities being made from the outside of an extruded preform of the annular part, they are suitably sealed to maintain the fluid connection cavities between the first and second conduits of the first and second circuits.

The first conduit and the second conduit of the second circuit can be sealed by third sealing members at their ends opening circumferentially at the first end of the annular part.

Also, the second member can be L-shaped, a first part of which is applied as a seal to the face on which the first and second conduits of the first and second circuits open.

This second organ can have a second part applied to the annular part so as to radially seal the second cavity. The second organ is preferably removably attached to the annular part. This can be done by screwing for example.

The disclosure also relates to a process for manufacturing the heat exchanger described above, comprising the following steps:
a) obtain, by extrusion, a preform of the annular part by means of a die shaped so that the preform comprises the first conduit and the second conduit of the first circuit,
b) make a first cavity at the first circumferential end of the annular part,
c) apply the removable sealing means at the first end so as to allow fluid flow from the second conduit into the first cavity and then into the first conduit.

Furthermore, the method can be such that the die is shaped so that the preform includes the first conduit and the second conduit of the second circuit.

DESCRIPTION OF THE DRAWINGS

The disclosure will be better understood and other details, characteristics and advantages of the disclosure will appear when reading the following description, which is given as a non-limiting example, with reference to the attached drawings.

DETAILED DESCRIPTION

Figure 1:
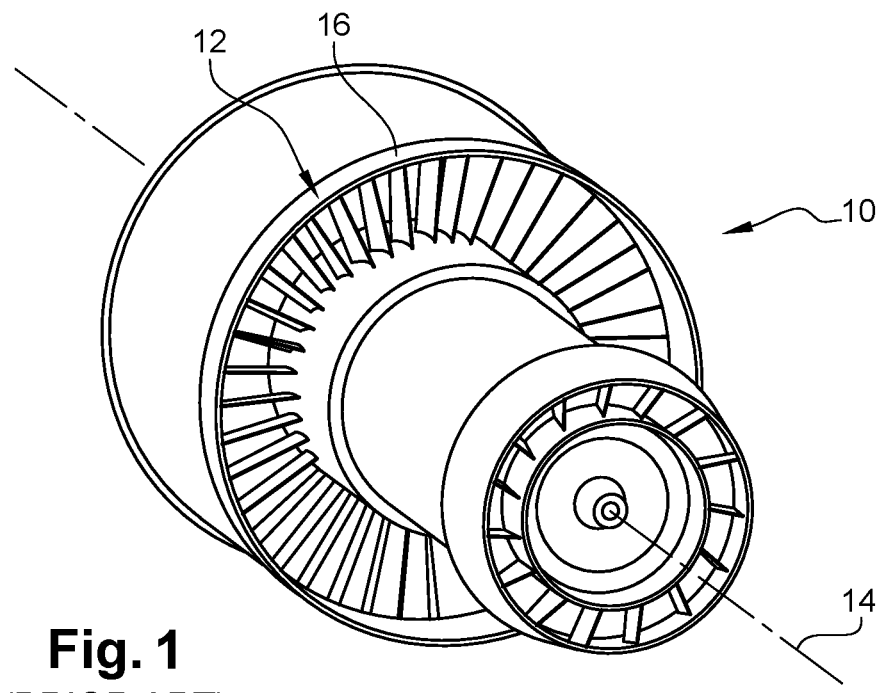
FIG. 1 is a schematic view, in perspective, of a turbomachine according to the known technique.
Figure 2:
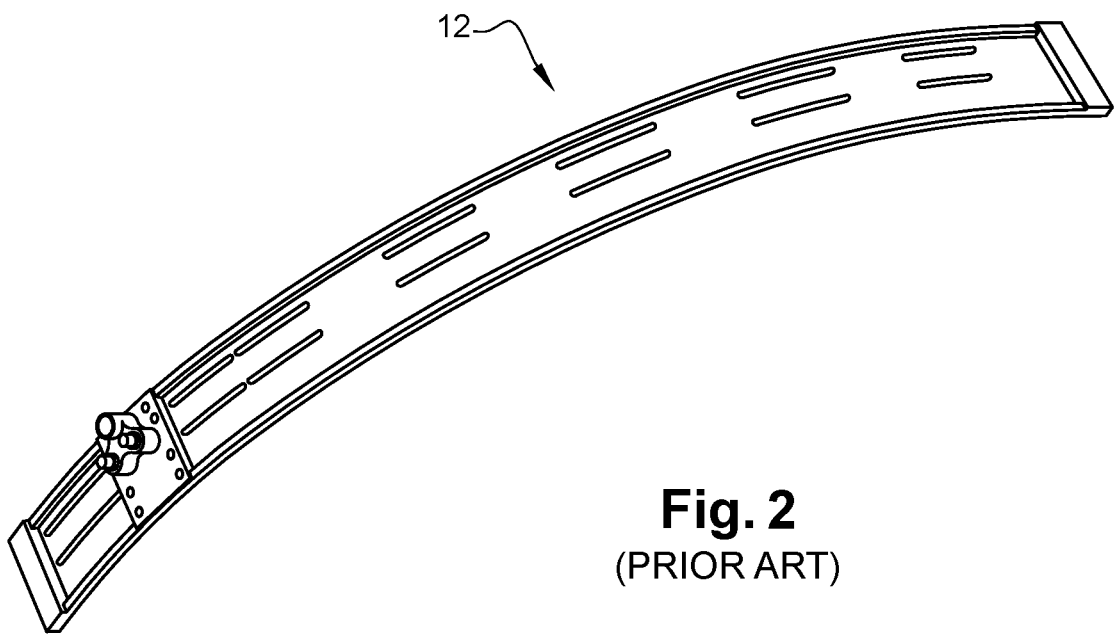
FIG. 2 is a schematic perspective view of a portion of an annular heat exchanger mounted in the turbomachine of FIG. 1.
Figure 3:
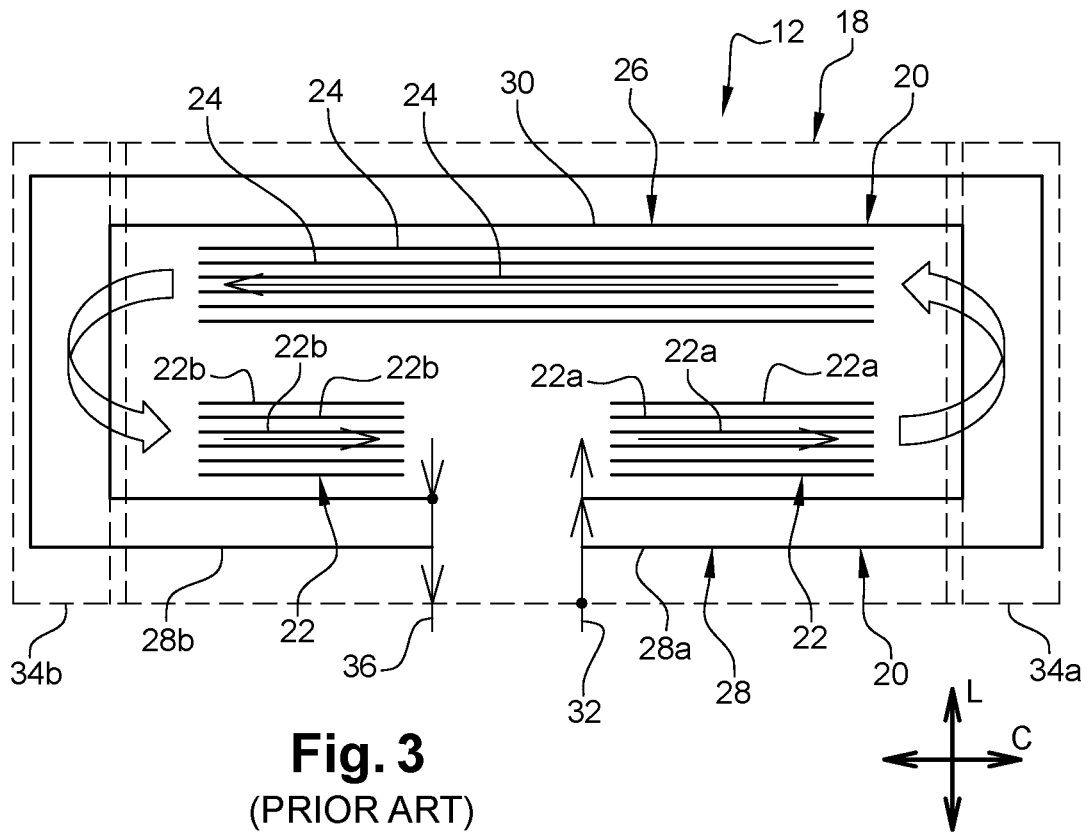
FIG. 3 is a schematic illustration of the exchanger of FIG. 2 and the flow of oil therein.
Figure 4:
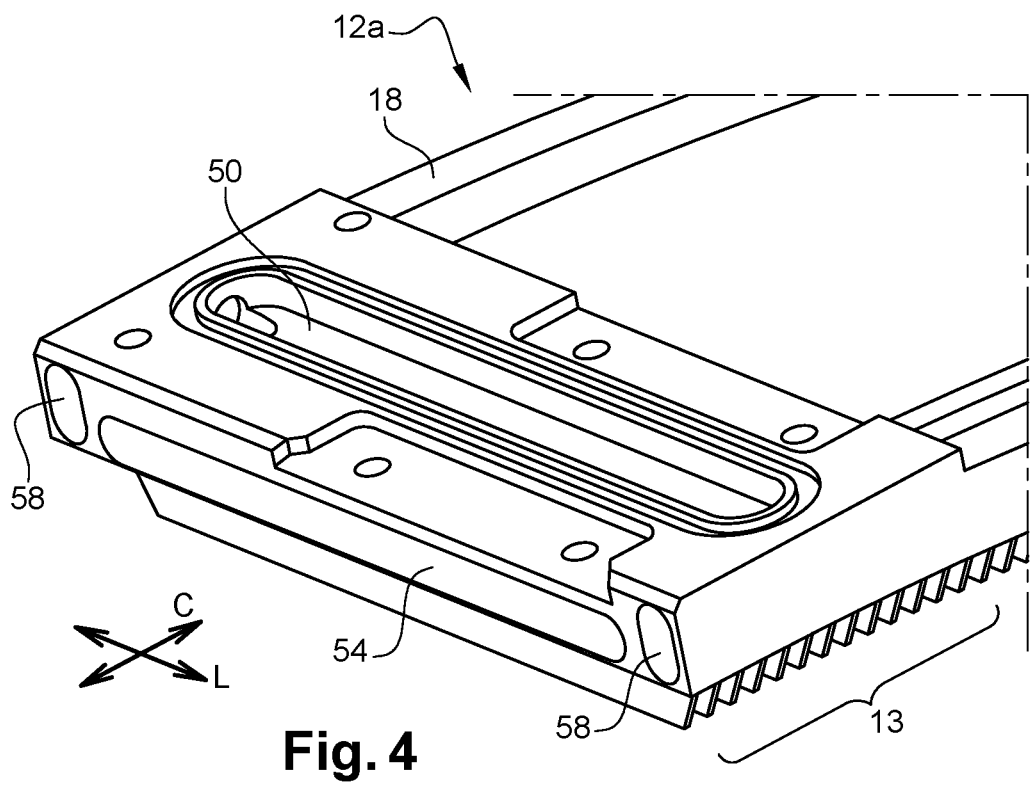
FIG. 4 is a schematic perspective view of a first end of a heat exchanger according to the disclosure.
Figure 5A:
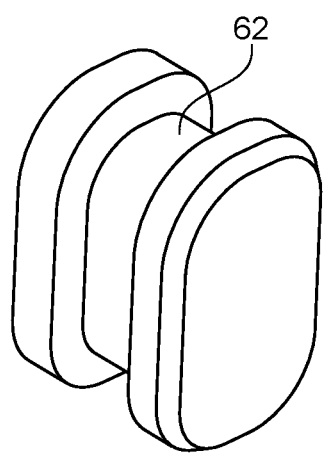
FIGS. 5A and 5B are schematic perspective views of sealing members mounted on the end of the heat exchanger.
Figure 5B:
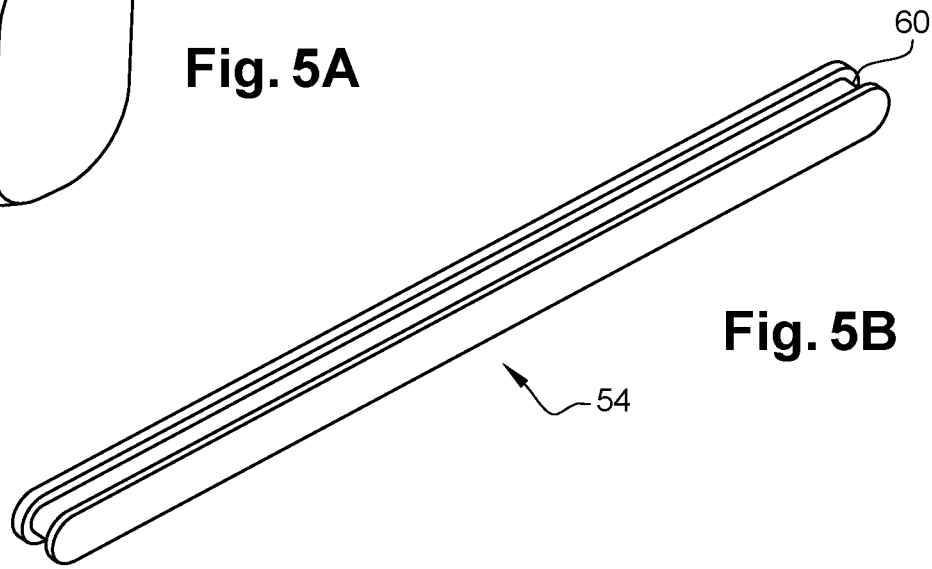
Figure 6:
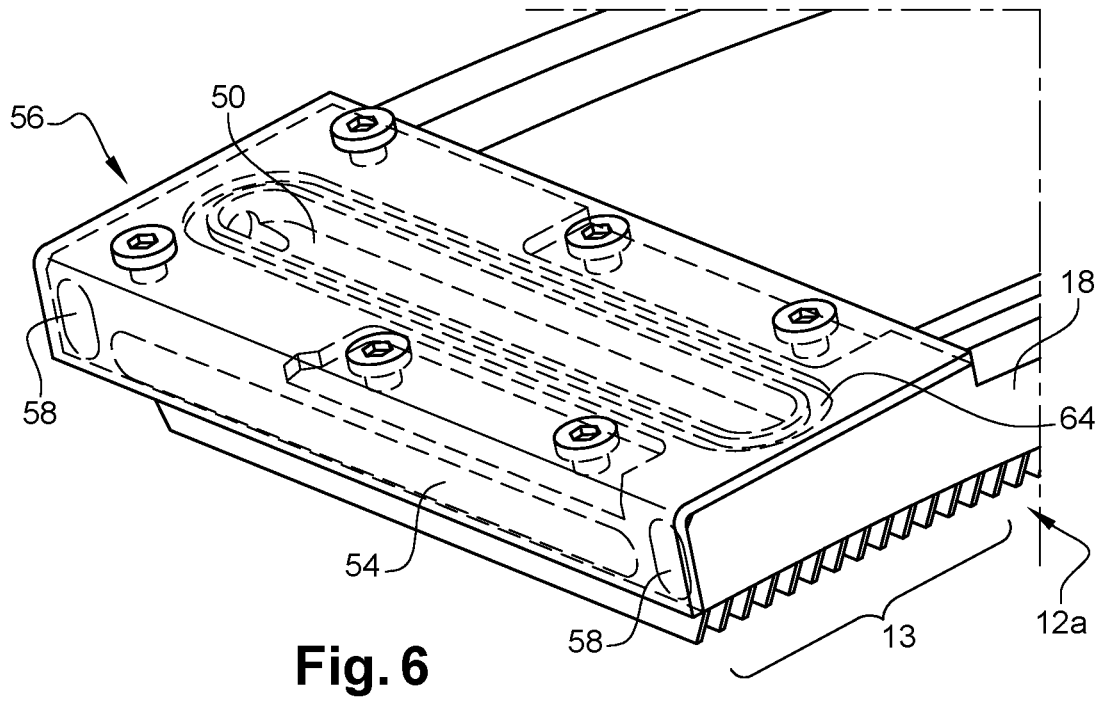
FIG. 6 is a schematic perspective view of the first end of the exchanger with another sealing member mounted on the end.

Reference is now made to FIGS. 4 to 6 which represent a heat exchanger 12a according to the disclosure. Similarly to what has been described with reference to FIG. 3, the exchanger 12a comprises an annular portion 18 also comprising a first fluidic circuit 37 of oil comprising a plurality of first conduits 38 and second conduits 40 substantially parallel to each other. to each other, the first conduits 38 comprising first and second portions 38b. The exchanger 12a also comprises a second fluidic thawing circuit 42 comprising a first conduit 44 and a second conduit 46 which are parallel, the first conduit 44 comprising a first portion (not visible) and a second portion 44b.

The first conduits 38, 44 and second conduits 40, 42 of the first and second circuits 37, 42 are quite similar to what has been described previously with reference to FIG. 3 and differ from them only in their fluid connection to each other at the circumferential ends of the heat exchanger. Also, what will be described with reference to the first circumferential end 13 of the heat exchanger is also valid for the second opposite circumferential end. Thus, the description will be made and shown only in relation to the first circumferential end 13 of the exchanger 12a using the second portion 44b of the first conduit 44 of the first circuit 37 and the second conduit 40 of the first circuit 37 as well as using the second portion 44b of the first conduit 44 and the second conduit 46 of the second circuit 42.

The disclosure therefore proposes to provide a fluid connection of the first conduits 38 and second conduits 40 of the first circuit 37 and the fluid connection of the first conduit 44 and the second conduit 46 of the second circuit 42 without having to use a member structurally independent connection of the annular part 18 of the heat exchanger.

Figure 7:
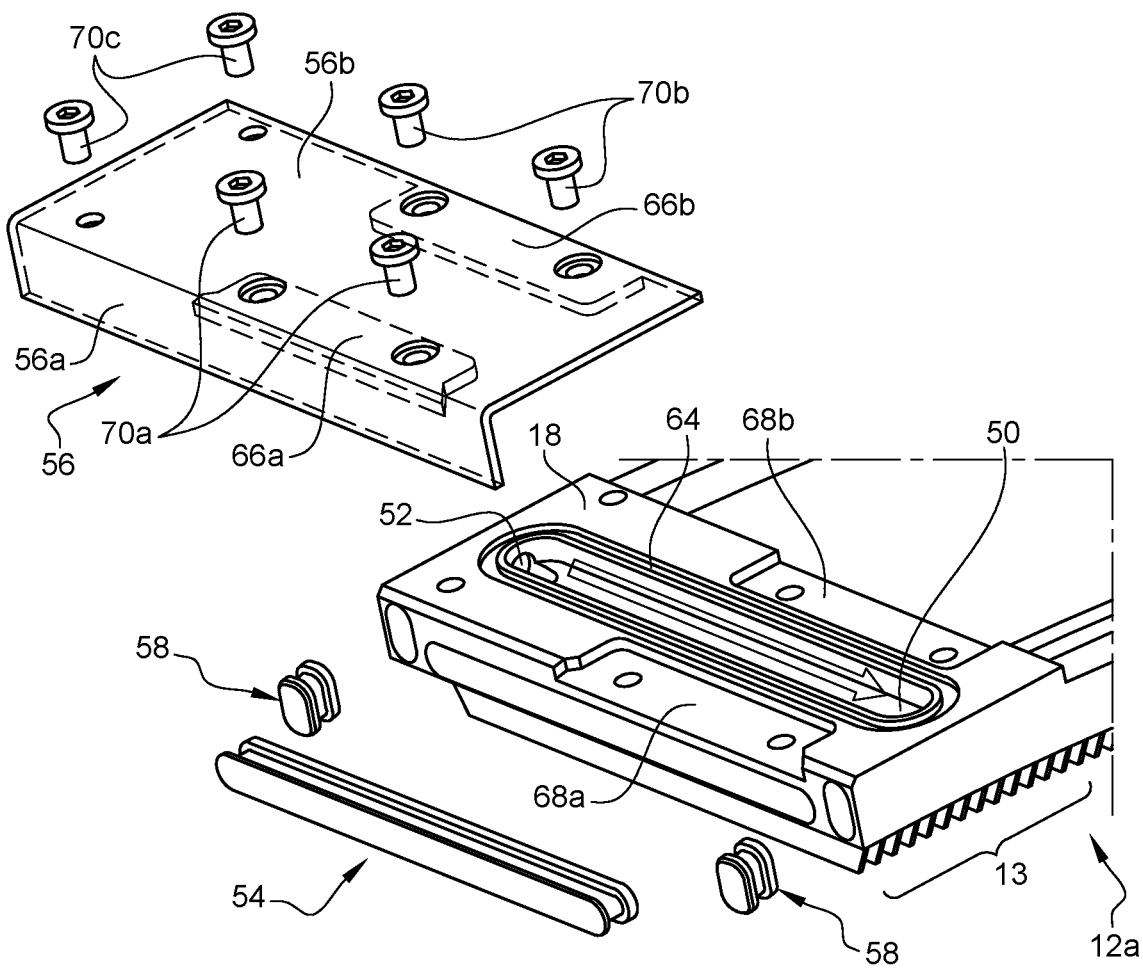
FIG. 7 is a schematic perspective view with exploding view of the first end of the exchanger.
Figure 8:
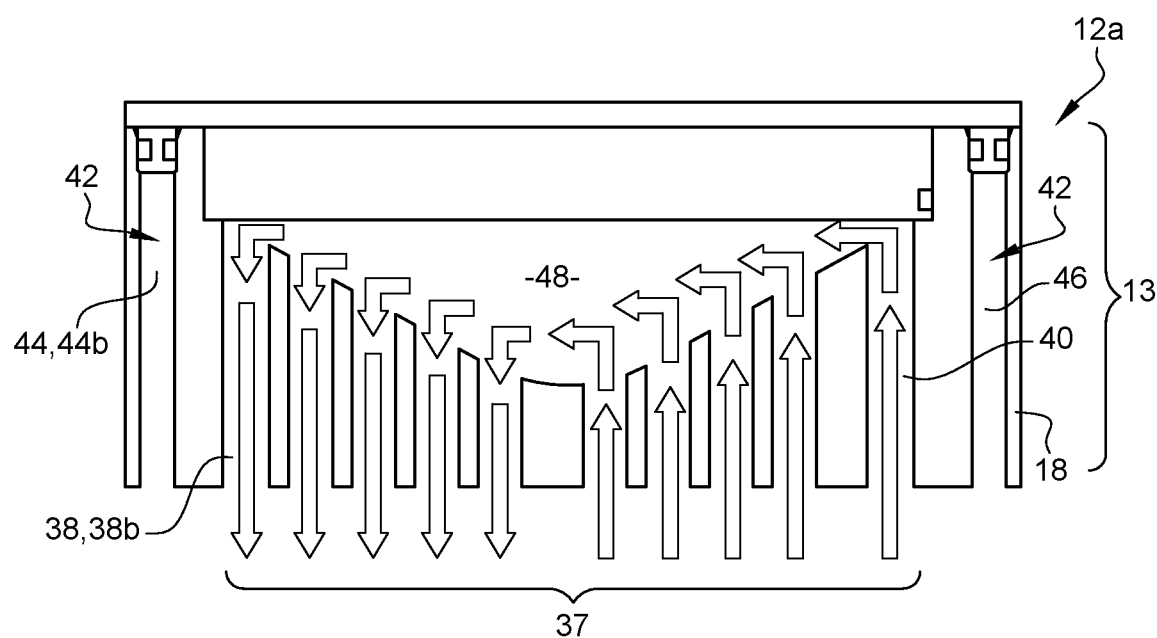
FIG. 8 is a schematic sectional view of the first end of the heat exchanger, the oil circulation being illustrated.

In order to achieve, the heat exchanger 12a, we first of all obtain a preform of the annular part 18 of the exchanger 12a which is made of a material which is a good conductor of heat such as 'an aluminum alloy for example. For this, a die is used which allows the first conduits 38 and second conduits 40 of the first circuit 37 and the first conduit 44 and the second conduit 46 of the second circuit 42 to be obtained simultaneously. At the end of this step, the first conduits 38, 44 and second conduits 40, 46 of the first 37 and second 42 circuits extend from the first end 13 to the second end of the annular part 18 and open in circumferential direction at the ends. In a second subsequent step, a first cavity 48 and a second cavity 50 are produced at the first circumferential end 13. The first cavity 48 opens in the circumferential direction and the second portions 38b of the first conduits 38 and the second conduits 40 of the first circuit 37 open into the first cavity 48. The second cavity 50 opens in the radial direction, more particularly radially outwards. This second cavity 50 has an elongated shape along the longitudinal axis L. This second cavity 50 is connected at its two axial ends to two holes 52 opening for one in the second portion 44b of the first conduit 44 of the second circuit 42 and for the other in the second conduit 46 (FIGS. 7 and 8).

In order to achieve allowing oil circulation in each of the first circuit 37 and the second circuit 42, sealing means are added. These sealing means comprise a first sealing member 54 (e.g., a first seal), a second sealing member 56 (e.g., a second seal) and third sealing members 58 (e.g., a third seal).

The first sealing member 54, visible in FIG. 5B, has an elongated shape in the longitudinal direction L and comprises an annular groove 60 in which is mounted a seal (not shown). This first sealing member 54 is mounted in the first cavity 48 and is dimensioned so that one face thereof comes opposite the outlets of the second portions 38b of the first conduits 38 and the outlets of the second conduits 40 of the first circuit 37 but without closing them off, this in order to allow an oil flow from the second conduits 40 to the second portions 38b of the second conduits 38. The seal prevents oil leaks.

The third sealing members 58 are inserted, at the first end 13 of the annular part 18, in the outlet of the second portion 44b of the first conduit 44 of the second circuit 42 and in the outlet of the second conduit 46 of the second circuit 42. Each of the third members 58 comprises an annular groove 62 in which is mounted a seal (not shown) in a similar manner to what has been described with reference to the first member 54, the function being identical.

The second member 56 makes it possible to close the outlet of the second cavity 50, more particularly to cover it radially. An annular groove 64 is formed around the periphery of the outlet of the second cavity 50. The annular groove 64 is intended to receive a seal (not shown). The second member 56 has an L-shape comprising a first substantially flat portion 56a intended to come to be applied in the circumferential direction on the first member 54 and the third members 58. It also comprises a second portion 56b having, on its radially internal face (in the direction of the axis 14), a first boss 66a and a second boss 66b arranged on either side of the second cavity 50 in the circumferential direction when the second member 56 is mounted on the annular part 18. The first boss 66a and the second boss 66b cooperate respectively with a first recess 68a and a second recess 68b formed on the radially external face of the annular part 18. The first recess 68a and the second recess 68b are formed in circumferential direction on either side of the second cavity 50. Thus, when the second part 56b of the second member 56 is mounted on the first end 13 of the annular part 18, the bosses 66a, 66b ensure a circumferential locking of the second member 56 on the annular part 18. Fixing screws pass through the second part and are screwed into the annular part 18, first screws 70a passing through the first boss 66a, second screws 70b passing through the second boss 66b and third screws 70c passing through an area of the second part 56b of the second member 56 separate from the first 66a and second 66b bosses.

According to the embodiment described above, it is possible to dismantle the sealing means, allowing the exchanger to be inspected if necessary. Furthermore, other removable fixing means can be used so that the disclosure is not limited to the sole use of fixing screws. It is understood that the removable rigid attachment/connection means must allow rapid assembly and disassembly.

If one wishes to use the same fluidic connection technique at the second end of the exchanger 12a as that exposed above at the first end, it is thus possible after the extrusion step to form a first cavity 48 and a second cavity 50 at the second end and to add sealing means such as those described above.

Also, the second cavity(s) 50 could open out radially inward if the exchanger 12a is mounted on a radially internal annular shell of the turbomachine.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An annular heat exchanger of a longitudinal axis for a turbomachine, comprising:
   a one-piece annular part comprising a first fluid circuit comprising a first conduit and a second conduit extending annularly, wherein the first conduit and the second conduit open into a first cavity formed at a circumferential first end of said annular part, wherein a plurality of removable sealing means is attached to said first end are configured to allow a flow of fluid from the second conduit, into the first cavity and then into the first conduit, wherein a second fluidic circuit comprising a third conduit and a fourth conduit is arranged on either side of the first conduit and the second conduit of the first fluid circuit in a circumferential direction extending annularly and perpendicular to the longitudinal axis, and wherein the third conduit and the fourth conduit of the second fluidic circuit open into a second cavity formed at the first circumferential end of said annular part and arranged radially outside the first cavity in a direction perpendicular to the longitudinal axis and the circumferential direction, the plurality of removable sealing means also being attached at said first end so as to allow a flow of fluid from the fourth conduit of the second fluidic circuit, into the second cavity and then into the third conduit of the second fluidic circuit.

2. The annular heat exchanger according to claim 1, wherein the first cavity opens circumferentially at a level of the first circumferential end and wherein the sealing means comprise a first sealing member mounted on an outlet of said first cavity.

3. The annular heat exchanger according to claim 2, wherein the second cavity opens radially at the first circumferential end and wherein the sealing means comprise a second sealing member mounted at an outlet of said second cavity.

4. The annular heat exchanger according to claim 3, wherein the second sealing member has an L-shape, a first part of the second sealing member is applied as a seal on a face on which the first conduit, the third conduit, the second conduit, and the fourth conduit each open.

5. The annular heat exchanger according to claim 4, in which the second sealing member has a second part applied to the annular part so as to close off the second cavity.

6. The annular heat exchanger according to claim 4, wherein the second sealing member is removably attached to the annular part.

7. The annular heat exchanger according to claim 6, wherein the second sealing member is fixed by screwing on the annular part.

8. The annular heat exchanger according to claim 1, wherein the third conduit and the fourth conduit of the second fluidic circuit are closed by third members.

9. A method for manufacturing an annular heat exchanger according to claim 1, the method comprising:
   extruding a preform of the annular part with a die shaped so that the preform comprises the first conduit and the second conduit of the first fluid circuit;

making the first cavity at a level of the first circumferential end of the annular part; and applying the removable sealing means at said first end so as to allow the flow of fluid from the second conduit, into the first cavity and then into the first conduit.

10. An annular heat exchanger of a longitudinal axis for a turbomachine, comprising: a one-piece annular part comprising a first fluid circuit comprising a first conduit and a second conduit extending annularly, wherein the first conduit and the second conduit open into a first cavity formed at a circumferential first end of said annular part, wherein at least one removable seal attached to said first end is configured to allow a flow of fluid from the second conduit, into the first cavity and then into the first conduit, wherein a second fluidic circuit comprising a third conduit and a fourth conduit is arranged on either side of the first conduit and the second conduit of the first fluid circuit in a circumferential direction extending annularly and perpendicular to the longitudinal axis, and wherein the third conduit and the fourth conduit of the second fluidic circuit open into a second cavity formed at the first circumferential end of said annular part and arranged radially outside the first cavity in a direction perpendicular to the longitudinal axis and the circumferential direction, the at least one seal also being attached at said first end so as to allow a flow of fluid from the fourth conduit of the second fluidic circuit, into the second cavity and then into the third conduit of the second fluidic circuit.

* * * * *